United States Patent
Hashimoto

(10) Patent No.: US 9,678,306 B2
(45) Date of Patent: Jun. 13, 2017

(54) IMAGING LENS COMPOSED OF SIX OPTICAL ELEMENTS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 77 days.

(21) Appl. No.: 14/619,296

(22) Filed: Feb. 11, 2015

(65) Prior Publication Data

US 2015/0241662 A1 Aug. 27, 2015

(30) Foreign Application Priority Data

Feb. 24, 2014 (JP) ................... 2014-032841

(51) Int. Cl.
*G02B 3/02* (2006.01)
*G02B 13/18* (2006.01)
*G02B 13/00* (2006.01)
*G02B 9/62* (2006.01)

(52) U.S. Cl.
CPC ............ *G02B 13/0045* (2013.01); *G02B 9/62* (2013.01)

(58) Field of Classification Search
CPC   G02B 13/0045; G02B 13/18; G02B 13/0015; G02B 9/60; G02B 27/0025
USPC .................................................. 359/642–830
See application file for complete search history.

(56) References Cited

U.S. PATENT DOCUMENTS

| | | | | |
|---|---|---|---|---|
| 5,815,324 A | * | 9/1998 | Yamamoto | G02B 15/161 359/692 |
| 2015/0323763 A1 | * | 11/2015 | Yuza | G02B 13/0045 359/714 |

FOREIGN PATENT DOCUMENTS

| | | |
|---|---|---|
| JP | 2010-026434 A | 2/2010 |
| JP | 2011-085733 A | 4/2011 |
| JP | 2014-232147 A | 12/2014 |
| JP | 2015-052686 A | 3/2015 |
| JP | 2015-060171 A | 3/2015 |
| JP | 2015-121601 A | 7/2015 |

\* cited by examiner

*Primary Examiner* — Mahidere Sahle
(74) *Attorney, Agent, or Firm* — Oliff PLC

(57) ABSTRACT

A compact, low-profile, low-cost imaging lens with an F-value of 2.5 or less and a wide field of view which corrects aberrations properly. Its elements are arranged from an object side to an image side: a first positive optical element group including a first positive lens having a convex object-side surface, a second negative lens having a concave image-side surface, and a third positive lens having a convex object-side surface; a second positive optical element group including a fourth positive lens having a convex image-side surface; and a third negative optical element group including a fifth negative double-sided aspheric lens having a concave image-side surface. The fifth lens image-side surface has at least one pole-change point off an optical axis. A double-sided aspheric aberration correction optical element with virtually no refractive power is located in an air gap nearer to the image plane than the first optical element group.

21 Claims, 12 Drawing Sheets

IMAGING LENS COMPOSED OF SIX OPTICAL ELEMENTS

The present application is based on and claims priority of Japanese patent application No. 2014-032841 filed on Feb. 24, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens composed of six optical elements which is built in an image pickup device mounted in an increasingly compact and low-profile smartphone or mobile phone, PDA (Personal Digital Assistant), game console, information terminal such as a PC, or home appliance with a camera function.

In the present invention, whether or not an optical element is a lens is decided depending on whether or not it has refractive power on an optical axis. An optical element having refractive power on the optical axis is called a lens. An optical element which does not have a lens function does not change the overall focal length and can contribute to improvement of aberrations in the peripheral area. In terms of lens surface shape, a convex surface or a concave surface means that the paraxial portion of the surface (portion near the optical axis) is convex or concave. A "pole-change point" on an aspheric surface means a point on the aspheric surface at which a tangential plane intersects the optical axis perpendicularly.

Description of the Related Art

In recent years, there has been a general tendency that many information terminals have a camera function. Also, home appliances with a camera have been introduced into the market. For example, a user who is away from home can see in real time what is going on at home, through the camera mounted in a home appliance by telecommunication between the home appliance and his/her smartphone. It is thought that products which enhance consumer convenience by adding a camera function to an information terminal or home appliance will be increasingly developed in the future. The camera mounted in such product is expected not only to provide high resolution to cope with an increase in the number of pixels but also to be compact and low-profile and offer high brightness and a wide field of view. In particular, the imaging lens to be built in a mobile terminal is strongly expected to be low-profile enough to be applicable to a low-profile product.

However, in order to provide a low-profile imaging lens with a wide field of view and high brightness as described above, the following problem has to be addressed: it is difficult to correct aberrations in the peripheral area of the image and deliver high imaging performance throughout the image.

Conventionally, for example, the imaging lenses described in JP-A-2010-026434 (Patent Document 1) and JP-A-2011-085733 (Patent Document 2) are known as compact high-resolution imaging lenses.

Patent Document 1 discloses a compact imaging lens composed of five constituent lenses in which a first positive lens, a second positive lens, a third negative lens, a fourth positive lens and a fifth negative lens are arranged in order from an object side. The imaging lens offers brightness with an F-value of about 2 and corrects various aberrations properly.

Patent Document 2 discloses an imaging lens which includes, in order from an object side, a first lens group including a first lens having a convex surface on the object side, a second lens group including a second lens having a concave surface on an image side, a third lens group including a third meniscus lens having a concave surface on the object side, a fourth lens group including a fourth meniscus lens having a concave surface on the object side, and a fifth lens group including a fifth meniscus lens having an aspheric surface with an inflection point on the object side. This configuration is intended to provide a compact imaging lens system which offers high resolution.

The imaging lens described in Patent Document 1, composed of five constituent lenses, corrects various aberrations properly and offers high brightness with an F-value of about 2.0 to about 2.5; however, its total track length is longer than the diagonal length of the effective imaging plane of the image sensor, which is disadvantageous in making the imaging lens low-profile. Furthermore, if this lens configuration is designed to offer a wide field of view, it will be difficult to correct aberrations in the peripheral area of the image.

The imaging lens described in Patent Document 2 is a relatively low-profile lens system which correct aberrations properly. However, in order for this configuration to offer brightness with an F-value of 2.8 or less and a field of view of 65 degrees or more, it is necessary to address the problem with difficulty in correction of aberrations in the peripheral area of the image.

As mentioned above, conventionally, it is difficult to provide a low-profile high-resolution imaging lens which offers a wide field of view and high brightness.

SUMMARY OF THE INVENTION

The present invention has been made in view of the above problem, and an object thereof is to provide a compact low-cost imaging lens which meets the demand for low-profileness even with an increase in the number of constituent lenses, offers brightness with an F-value of 2.5 or less and a wide field of view and corrects various aberrations properly.

Here, "low-profile" implies that total track length is smaller than the diagonal length of the effective imaging plane of the image sensor and "wide field of view" implies that the field of view is 70 degrees or more. The diagonal length of the effective imaging plane of the image sensor means the diameter of an effective imaging circle whose radius is the vertical height from an optical axis to the point where a light ray incident on the imaging lens at a maximum field of view enters the image plane, that is, the maximum image height.

According to a first aspect of the present invention, an imaging lens is composed of six optical elements which forms an image of an object on a solid-state image sensor and has a configuration in which the elements are arranged in order from an object side to an image side as follows: a first optical element group with positive refractive power including a first lens with positive refractive power having a convex surface on the object side as a first optical element, a second lens with negative refractive power having a concave surface on the image side as a second optical element, and a third lens with positive refractive power having a convex surface on the object side as a third optical element; a second optical element group with positive refractive power including a fourth lens with positive refractive power having a convex surface on the image side as a fourth optical element; and a third optical element group with negative refractive power including a fifth double-sided aspheric lens with negative refractive power having a concave surface on the image side as a fifth optical element. At least one pole-change point is formed off an optical axis on the image-side surface of the fifth lens and a double-sided aspheric aberration correction optical element with virtually no refractive power as a sixth optical element is located in an air gap nearer to an image plane than the first optical element group.

According to a second aspect of the present invention, an imaging lens is composed of six optical elements which forms an image of an object on a solid-state image sensor and has a configuration in which elements are arranged in order from an object side to an image side as follows: a first optical element group with positive refractive power including a first lens with positive refractive power having a convex surface on the object side as a first optical element, a second lens with positive refractive power having a convex surface on the object side as a second optical element, and a third lens with negative refractive power having a concave surface on the image side as a third optical element; a second optical element group with positive refractive power including a fourth lens with positive refractive power having a convex surface on the image side as a fourth optical element; and a third optical element group with negative refractive power including a fifth double-sided aspheric lens with negative refractive power having a concave surface on the image side as a fifth optical element. At least one pole-change point is formed off an optical axis on the image-side surface of the fifth lens and a double-sided aspheric aberration correction optical element with virtually no refractive power as a sixth optical element is located in an air gap nearer to an image plane than the first optical element group.

In the imaging lens composed of six optical elements according to the first or the second aspect, the first positive optical element group, the second positive optical element group and the third negative optical element group are arranged in order from the objet side, making a so-called telephoto type power arrangement, which is advantageous in making the imaging lens low-profile.

In the imaging lens according to the first aspect, the first optical element group uses the first positive lens as the first optical element to achieve low-profileness, the second negative lens as the second optical element to correct spherical aberrations and chromatic aberrations properly, and the third relatively weak positive lens as the third optical element to correct high-order spherical aberrations, coma aberrations, and field curvature. The second optical element group uses the fourth relatively strong positive lens as the fourth optical element to ensure low-profileness and correct astigmatism and field curvature. The fifth lens as the fifth optical element, which constitutes the third optical element group, corrects spherical aberrations which occur on the fourth lens, and has an aspheric surface with at least one pole-change point off the optical axis on its image side to correct field curvature and control the angle of a chief ray incident on the image sensor appropriately. The aberration correction optical element with virtually no refractive power as the sixth optical element is located in an air gap nearer to the image plane than the first optical element group to correct aberrations in the peripheral area of the image properly.

In the imaging lens according to the second aspect, in the first optical element group, positive refractive power is appropriately distributed to the first lens as the first optical element and the second lens as the second optical element to achieve low-profileness while suppressing spherical aberrations, and the third negative lens as the third optical element is used to correct spherical aberrations and chromatic aberrations properly. In the second optical element group, the fourth lens as the fourth optical element has relatively strong positive power to ensure low-profileness and correct astigmatism and field curvature. The fifth lens as the fifth optical element, which constitutes the third optical element group, corrects spherical aberrations which occur on the fourth lens, and has an aspheric surface with at least one pole-change point off the optical axis on its image side to correct field curvature and control the angle of a chief ray incident on the image sensor appropriately. The aberration correction optical element with virtually no refractive power as the sixth optical element is located in an air gap nearer to the image plane than the first optical element group to correct aberrations in the peripheral area of the image properly.

In the imaging lenses according to the first and second aspects, since the aberration correction optical element with virtually no refractive power as the sixth optical element has a parallel plate shape near the optical axis, it influences neither the refractive power of the overall optical system of the imaging lens, nor the refractive power of any of the constituent lenses. Therefore, it is effective in correcting aberrations only in the peripheral area without changing the focal length of the optical system.

In the imaging lenses according to the first and second aspects, the aberration correction optical element with virtually no refractive power as the sixth optical element is located in an air gap between the first optical element group and the second optical element group, in an air gap between the second optical element group and the third optical element group, or in an air gap between the third optical element group and the image plane, so that the aspheric surfaces on the both sides can properly correct aberrations in the peripheral area of the optical element group(s) located nearer to the object than the aberration correction optical element and thus aberrations of rays over a wide field of view are improved effectively.

Preferably, the imaging lenses according to the first and second aspects satisfy conditional expressions (1) and (2) below:

$$0.1 < TN/f < 0.5 \quad (1)$$

$$40 < vdN < 60 \quad (2)$$

where

TN: distance on the optical axis of an air gap between lenses where the aberration correction optical element is located f: focal length of an overall optical system of the imaging lens vdN: Abbe number of the aberration correction optical element at d-ray.

The conditional expression (1) defines an appropriate range for the size (distance) of the space where the aberration correction optical element is located, and indicates a condition to ensure low-profileness and correct aberrations in the peripheral area properly. If the value is above the upper limit of the conditional expression (1), the space for the aberration correction optical element would be too large to ensure low-profileness. On the other hand, if the value is below the lower limit, the space for the aberration correction optical element would be too small, which would impose a restriction on the aspheric shapes of the both surfaces of the element and make it difficult to correct aberrations properly. If the aberration correction optical element is located between the fifth lens and the image plane, the "distance on the optical axis between lenses where the aberration correction optical element is located" in the conditional expression (1) means the distance on the optical axis between the image-side surface of the fifth lens and the image plane.

The conditional expression (2) defines an appropriate range for the Abbe number of the material of the aberration correction optical element. When a material which satisfies the conditional expression (2), that is, a low-dispersion material, is adopted, aberrations in the peripheral area are corrected properly.

In the imaging lenses composed of six optical elements according to the first and second aspects, it is preferable that the aspheric surfaces on the both sides of the aberration correction optical element be shaped so as to curve toward the object side with increasing distance from the optical axis. These aspheric surfaces can control the angles of rays outgoing from the aberration correction optical element and suppress aberrations of marginal rays. This makes it easy to correct aberrations in the peripheral area which may increase as the field of view is wider and the F-value is smaller.

Preferably, the imaging lenses according to the first and second aspects satisfy a conditional expression (3) below:

$$1.0 < fLG1/f < 2.0 \quad (3)$$

where
fLG1: focal length of the first optical element group
f: focal length of the overall optical system of the imaging lens.

The conditional expression (3) defines an appropriate range for the ratio of the focal length of the first optical element group to the focal length of the overall optical system of the imaging lens, and indicates a condition to ensure low-profileness and correct chromatic aberrations. If the value is above the upper limit of the conditional expression (3), the positive refractive power of the first optical element group would be weaker, making it difficult to ensure low-profileness. On the other hand, if the value is below the lower limit of the conditional expression (3), the positive refractive power of the first optical element group would be stronger, making it difficult to correct chromatic aberrations properly.

Preferably, the imaging lenses according to the first and second aspects satisfy a conditional expression (4) below:

$$0.3 < fLG2/f < 1.0 \quad (4)$$

where
fLG2: focal length of the second optical element group
f: focal length of the overall optical system of the imaging lens.

The conditional expression (4) defines an appropriate range for the ratio of the focal length of the second optical element group to the focal length of the overall optical system of the imaging lens, and indicates a condition to ensure low-profileness and correct spherical aberrations and coma aberrations. If the value is above the upper limit of the conditional expression (4), the positive refractive power of the second optical element group would be weaker, making it difficult to ensure low-profileness. On the other hand, if the value is below the lower limit of the conditional expression (4), the positive refractive power of the second optical element group would be stronger, making it difficult to correct spherical aberrations and coma aberrations properly.

Preferably, the imaging lenses according to the first and second aspects satisfy a conditional expression (5) below:

$$-0.8 < fLG3/f < -0.2 \quad (5)$$

where
fLG3: focal length of the third optical element group
f: focal length of the overall optical system of the imaging lens.

The conditional expression (5) defines an appropriate range for the ratio of the focal length of the third optical element group to the focal length of the overall optical system of the imaging lens, and indicates a condition to ensure low-profileness and correct spherical aberrations and chromatic aberrations. If the value is above the upper limit of the conditional expression (5), the negative refractive power of the third optical element group would be stronger, making it difficult to ensure low-profileness. On the other hand, if the value is below the lower limit of the conditional expression (5), the negative refractive power of the third optical element group would be weaker, making it difficult to correct spherical aberrations and chromatic aberrations properly.

Preferably, the imaging lenses according to the first and second aspects satisfy a conditional expression (6) below:

$$0.8 < (r7+r8)/(r7-r8) < 4.5 \quad (6)$$

where
r7: curvature radius of the object-side surface of the fourth lens constituting the second optical element group
r8: curvature radius of the image-side surface of the fourth lens constituting the second optical element group.

The conditional expression (6) defines an appropriate range for the ratio of the sum of the curvature radii of the object-side and image-side surfaces of the fourth lens constituting the second optical element group to the difference between the curvature radii, which represents the shape of the fourth lens, and indicates a condition to ensure low-profileness and correct spherical aberrations properly. When the conditional expression (6) is satisfied, the fourth lens has a meniscus shape with a convex surface on the image side rather than a biconvex shape. If the value is above the upper limit of the conditional expression (6), the fourth lens would have a stronger meniscus shape to cause the principal point of the image-side surface of the fourth lens to shift toward the image side, which might result in a longer total track length and make it difficult to ensure low-profileness. Furthermore, spherical aberrations might be too excessive to be corrected by the fifth lens. On the other hand, if the value is below the lower limit of the conditional expression (6), the fourth lens would be a biconvex lens in which the principal point on the image side shifts toward the object side, making it difficult to ensure an appropriate back focus, though it would be advantageous in ensuring low-profileness and suppressing spherical aberrations.

Preferably, the imaging lenses according to the first and second aspects satisfy conditional expressions (7) and (8) below:

$$fLG1 > fLG2 \quad (7)$$

$$fLG2 > |fLG3| \quad (8)$$

where
fLG1: focal length of the first optical element group
fLG2: focal length of the second optical element group
fLG3: focal length of the third optical element group.

The conditional expression (7) defines an appropriate relation in focal length between the first positive optical element group and the second positive optical element group, and indicates a condition to ensure low-profileness and correct various aberrations properly. When the conditional expression (7) is satisfied, the positive refractive power of the first optical element group is prevented from being excessive and aberrations within the first optical element group are corrected properly and the second optical element group is given strong positive refractive power to make it easy to ensure low-profileness. The conditional expression (8) defines an appropriate relation in focal length between the second positive optical element group and the third negative optical element group, and indicates a condition to make it easy for the third optical element group to correct spherical aberrations which occur on the second optical element group with strong positive refractive power for low-profileness.

In addition, in the imaging lenses according to the first and second aspects, it is preferable that the Abbe number of the optical element with negative refractive power in the first optical element group be from 20 to 30 and the Abbe numbers of the four other elements with refractive power be from 40 to 70. When the negative optical element in the first optical element group is made of high-dispersion material, axial aberrations and chromatic aberrations of magnification can be corrected properly. When the four other optical elements with refractive power are made of low-dispersion material, chromatic aberrations of magnification can be suppressed easily. The above-defined ranges of Abbe numbers suggest that all optical elements with refractive power can be made of plastic material, so the imaging lens can be manufactured at low cost.

DETAILED DESCRIPTION OF THE PREFERRED EMBODIMENTS

Figure 1:
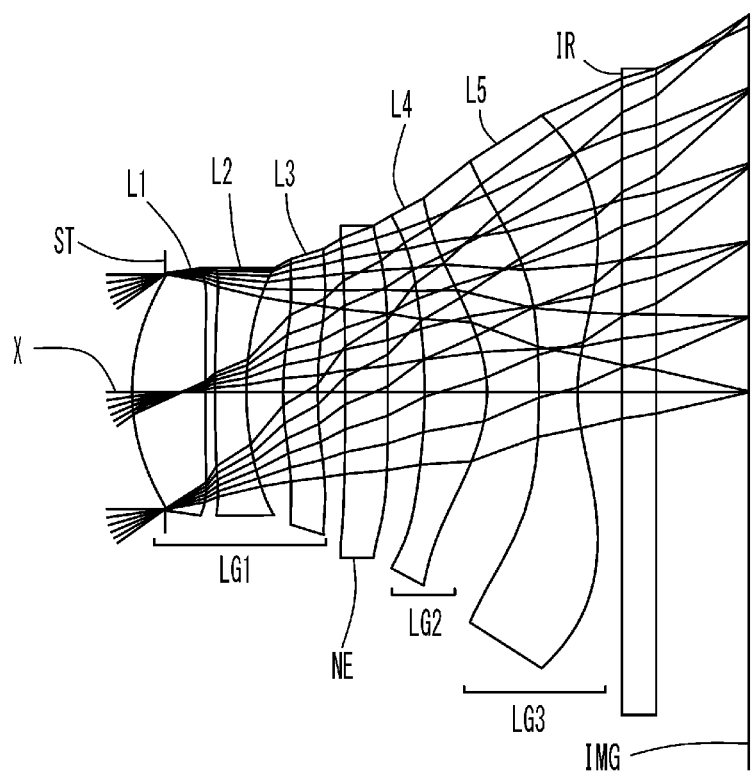
FIG. 1 is a schematic view showing the general configuration of an imaging lens in Numerical Example 1 according to a first embodiment of the present invention.
Figure 3:
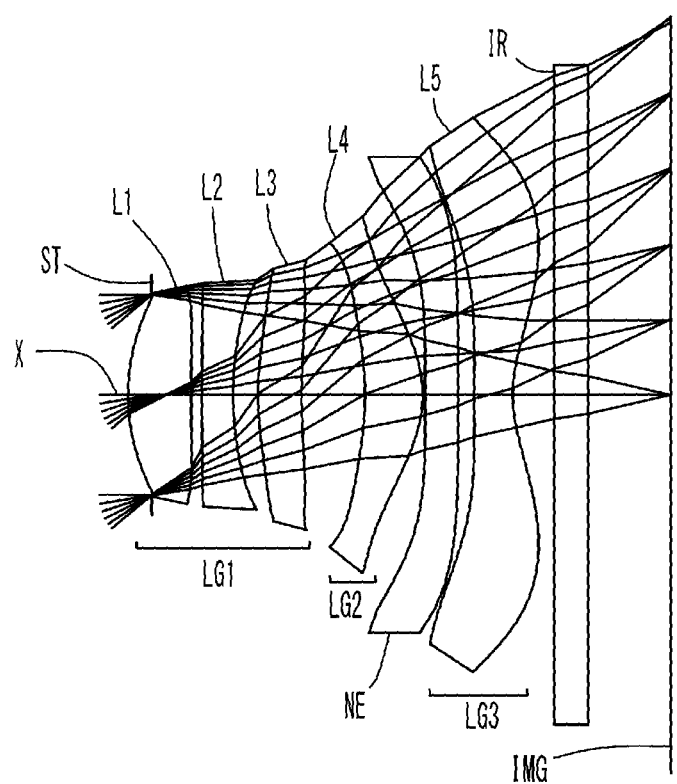
FIG. 3 is a schematic view showing the general configuration of an imaging lens in Numerical Example 2 according to the first embodiment of the present invention.
Figure 5:
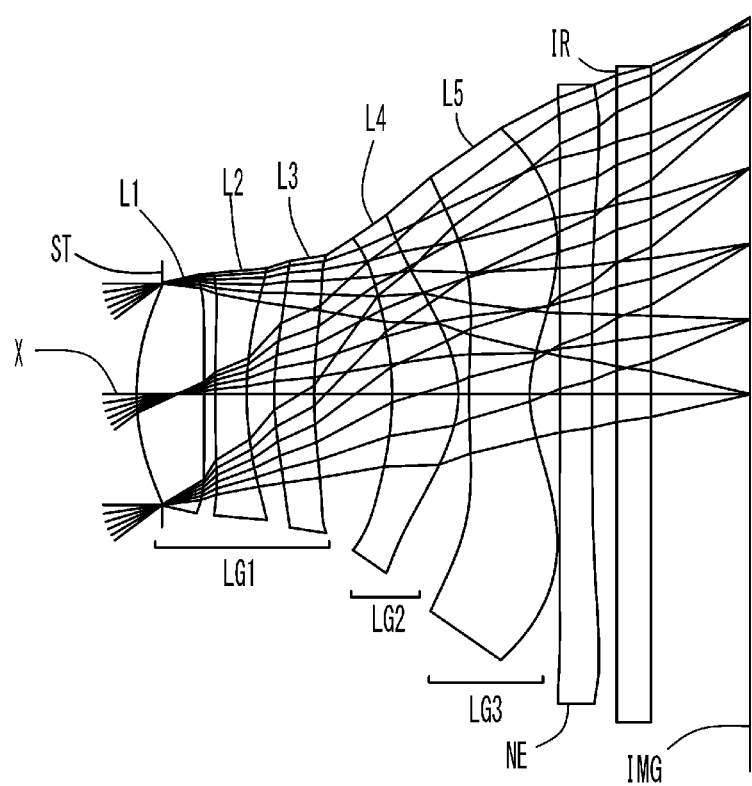
FIG. 5 is a schematic view showing the general configuration of an imaging lens in Numerical Example 3 according to the first embodiment of the present invention.
Figure 7:
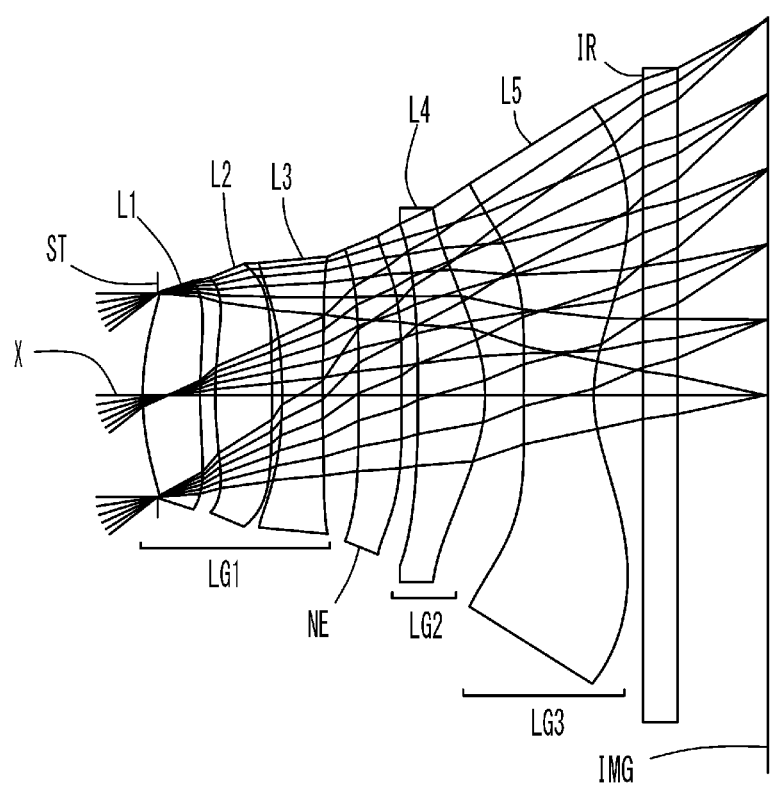
FIG. 7 is a schematic view showing the general configuration of an imaging lens in Numerical Example 4 according to a second embodiment of the present invention.
Figure 9:
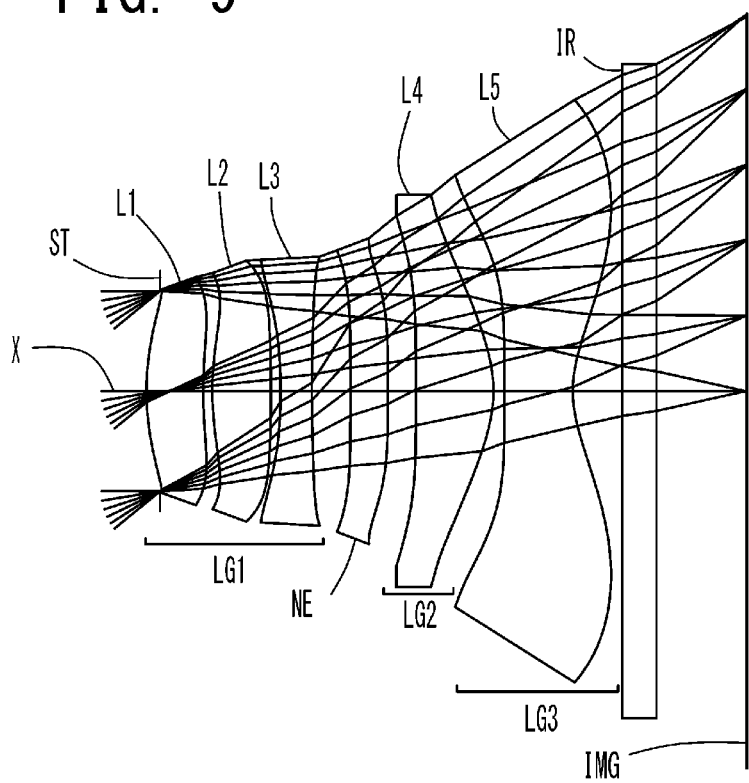
FIG. 9 is a schematic view showing the general configuration of an imaging lens in Numerical Example 5 according to the second embodiment of the present invention.
Figure 11:
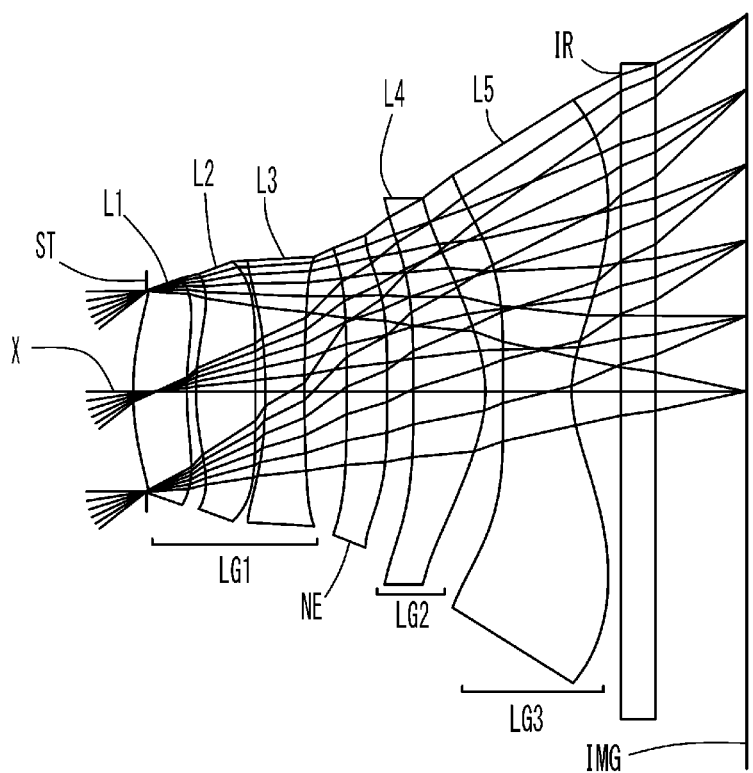
FIG. 11 is a schematic view showing the general configuration of an imaging lens in Numerical Example 6 according to the second embodiment of the present invention.

Hereinafter, the preferred embodiments of the present invention will be described in detail referring to the accompanying drawings. FIGS. 1, 3, and 5 are schematic views showing the general configurations of the imaging lenses in Examples 1 to 3 according to a first embodiment respectively and FIGS. 7, 9, and 11 are schematic views showing the general configurations of the imaging lenses in Examples 4 to 6 according to a second embodiment respectively. The general configuration of the first embodiment and that of the second embodiment are explained below mainly referring to the schematic view of Example 1 and the schematic view of Example 4, respectively.

First Embodiment

Next, a first embodiment of the present invention will be described in detail.

As shown in FIG. 1, the imaging lens composed of six optical elements according to the first embodiment includes, in order from an object side: a first positive optical element group LG1 including a first positive lens L1 as a first optical element, a second negative lens L2 as a second optical element, and a third positive lens L3 as a third optical element; a second positive optical element group LG2 including a fourth positive lens L4 as a fourth optical element; and a third negative optical element group LG3 including a fifth negative lens L5 as a fifth optical element. As a sixth optical element, a double-sided aspheric aberration correction optical element NE which has virtually no refractive power is located between the first optical element group LG1 and the second optical element group LG2. Thus, the imaging lens according to this embodiment includes a total of six optical elements: five optical elements with refractive power and one aberration correction optical element with virtually no refractive power. As mentioned above, the three lens groups are positive, positive, and negative refractive power lens groups arranged in order from the object side, offering an advantageous configuration to achieve low-profileness or shorten the total track length.

A filter IR such as an infrared cut filter is located between the third optical element group LG3 and the image plane IMG. The filter IR is omissible. The values of total track length and back focus of the imaging lens according to this embodiment are defined as distances calculated with the filter IR removed. An aperture stop ST is located on the object side of the first lens L1.

In the first optical element group LG1 of the configuration of the first embodiment, the first lens L1, a meniscus lens with relatively strong positive refractive power having a convex surface on the object side, contributes to low-profileness, the second lens L2, a meniscus lens with negative refractive power having a concave surface on the image side, corrects spherical aberrations and chromatic aberrations properly, and the third lens L3, a meniscus double-sided aspheric lens with the weakest positive refractive power having a convex surface on the object side, corrects high-order spherical aberrations, coma aberrations, and field curvature. The second optical element group LG2 includes the fourth lens L4 as a meniscus double-sided aspheric lens with stronger positive refractive power than the first optical element group LG1, having a convex surface on the image side, and ensures low-profileness and corrects astigmatism and field curvature. The third optical element group LG3 includes the fifth lens L5 as a biconcave double-sided aspheric lens with stronger negative refractive power than the fourth lens L4, and effectively corrects spherical aberrations which occur on the fourth lens L4. The image-side surface of the fifth lens L5 has a pole-change point off the optical axis so that the negative refractive power of the fifth lens L5 changes to positive refractive power in the peripheral portion. Since the refractive power of the fifth lens L5 is thus changed in the area from the central portion to the peripheral portion appropriately, field curvature is corrected and the angle of a chief ray incident on the image sensor is controlled appropriately. Furthermore, since the aberration correction optical element NE, a double-sided aspheric lens which has a flat surface near the optical axis and has virtually no refractive power, is located in the air gap between the first optical element group LG1 and the second optical element group LG2, its aspheric surfaces on the both sides correct aberrations in the peripheral area properly.

The shape of the fifth lens L5, which constitutes the third optical element group LG3, is not limited to a biconcave shape. It may be a meniscus shape as in Examples 2 and 3 shown in FIGS. 3 and 5 respectively. In that case, it is preferable that the object-side surface be an aspheric surface with a pole-change point.

The aberration correction optical element NE, a double-sided aspheric lens which has a flat surface near the optical axis and has virtually no refractive power, should be at least located in an air gap nearer to the image plane than the first optical element group LG1. FIG. 3 shows Example 2 in which it is located between the second optical element group LG2 and the third optical element group LG3 and FIG. 5 shows Example 3 in which it is located between the third optical element group LG3 and the image plane IMG.

The aperture stop ST is located on the object side of the first optical element group LG1. Therefore, the exit pupil is remote from the image plane IMG, thereby making it easy to ensure telecentricity.

Second Embodiment

Next, a second embodiment of the present invention will be described in detail.

As shown in FIG. 7, the imaging lens according to the second embodiment includes, in order from an object side: a first positive optical element group LG1 including a first positive lens L1 as a first optical element, a second positive lens L2 as a second optical element, and a third negative lens L3 as a third optical element; a second positive optical element group LG2 including a fourth positive lens L4 as a fourth optical element; and a third negative optical element group LG3 including a fifth negative lens L5 as a fifth optical element. As a sixth optical element, a double-sided aspheric aberration correction optical element NE which has virtually no refractive power is located between the first optical element group LG1 and the second optical element group LG2. Thus, the imaging lens according to this embodiment includes a total of six optical elements: five optical elements with refractive power and one aberration correction optical element with virtually no refractive power. As in the first embodiment, the three lens groups are positive, positive, and negative refractive power lens groups arranged in order from the object side, offering an advantageous configuration to achieve low-profileness or shorten the total track length.

A filter IR such as an infrared cut filter is located between the third optical element group LG3 and the image plane IMG. The filter IR is omissible. The values of total track length and back focus of the imaging lens according to this embodiment are defined as distances calculated with the filter IR removed. An aperture stop ST is located on the object side of the first lens L1.

In the first optical element group LG1 of the configuration of the second embodiment, two positive lenses, the first lens L1 as a meniscus lens with positive refractive power having a convex surface on the object side and the second lens L2 as a biconvex lens with positive refractive power, suppress spherical aberrations and contribute to low-profileness, and the third lens L3 as a biconcave lens with negative refractive power corrects spherical aberrations and chromatic aberrations properly. The second optical element group LG2 includes the fourth lens L4 as a meniscus double-sided aspheric lens with stronger positive refractive power than the first optical element group LG1, having a convex surface on the image side, and ensures low-profileness and corrects astigmatism and field curvature. The third optical element group LG3 includes the fifth lens L5 as a meniscus double-sided aspheric lens with stronger negative refractive power than the fourth lens L4, having a concave surface on the image side, and effectively corrects spherical aberrations which occur on the fourth lens L4. The image-side surface of the fifth lens L5 has a pole-change point off the optical axis so that the negative refractive power of the fifth lens L5 changes to positive refractive power in the peripheral portion. Since the refractive power of the fifth lens L5 is thus changed in the area from the central portion to the peripheral portion appropriately, field curvature is corrected and the angle of a chief ray incident on the image sensor is controlled appropriately. Furthermore, since the aberration correction optical element NE, a double-sided aspheric lens which has a flat surface near the optical axis and has virtually no refractive power, is located in the air gap between the first optical element group LG1 and the second optical element group LG2, its aspheric surfaces on the both sides correct aberrations in the peripheral area properly.

The second lens L2 should at least have positive refractive power and as in Example 6 shown in FIG. 11, it may have a meniscus shape with a convex surface on the object side. The fourth lens L4, which constitutes the second optical element group LG2, may have a biconvex shape with a convex surface on each of the object side and image side, as in Example 5 shown in FIG. 9. The fifth lens L5 may have a biconcave shape as in Example 6 shown in FIG. 11.

The aberration correction optical element NE, a double-sided aspheric lens with virtually no refractive power, should be at least located in an air gap nearer to the image plane than the first optical element group LG1.

In the second embodiment as well, the aperture stop ST is located on the object side of the first lens L1. Therefore, the exit pupil is remote from the image plane IMG, thereby making it easy to ensure telecentricity.

Since the aberration correction optical element NE with virtually no refractive power, which is included in the first and second embodiments, has a parallel plate shape near the optical axis, it influences neither the refractive power of the overall optical system of the imaging lens, nor the refractive power of any of the five constituent lenses from the first lens L1 as the first optical element to the fifth lens L5 as the fifth optical element. Therefore, it is possible to correct aberrations only in the peripheral area without changing parameters such as focal length and lens center thickness.

The both aspheric surfaces of the aberration correction optical element NE are shaped so as to curve more toward the object side on both the object side and image side with increasing distance from the optical axis X. These aspheric surfaces control the angles of rays outgoing from the aberration correction optical element NE and make it easy to suppress aberrations of marginal rays. Consequently, aberrations in the peripheral area which may increase as the field of view is wider and the F-value is smaller are corrected properly.

When the imaging lenses composed of six optical elements according to the first and second embodiments satisfy conditional expressions (1) to (8) below, they bring about advantageous effects:

$$0.1 < TN/f < 0.5 \tag{1}$$

$$40 < vdN < 60 \tag{2}$$

$$1.0 < fLG1/f < 2.0 \tag{3}$$

$$0.3 < fLG2/f < 1.0 \tag{4}$$

$$-0.8 < fLG3/f < -0.2 \tag{5}$$

$$0.8 < (r7+r8)/(r7-r8) < 4.5 \tag{6}$$

$$fLG1 > fLG2 \tag{7}$$

$$fLG2 > |fLG3| \tag{8}$$

where
TN: distance on the optical axis between lenses where the aberration correction optical element NE is located
f: focal length of the overall optical system of the imaging lens
vdN: Abbe number of the aberration correction optical element NE at d-ray
fLG1: focal length of the first optical element group LG1
fLG2: focal length of the second optical element group LG2
fLG3: focal length of the third optical element group LG3
r7: curvature radius of the object-side surface of the fourth lens L4 constituting the second optical element group
r8: curvature radius of the image-side surface of the fourth lens L4 constituting the second optical element group.

When the imaging lenses composed of six optical elements according to the first and second embodiments satisfy conditional expressions (1a) to (6a) below, they bring about more advantageous effects:

$$0.1 < TN/f < 0.3 \tag{1a}$$

$$50 < vdN < 60 \tag{2a}$$

$$1.0 < fLG1/f < 1.8 \tag{3a}$$

$$0.4 < fLG2/f < 0.8 \tag{4a}$$

$$-0.65 < fLG3/f < -0.35 \tag{5a}$$

$$0.9 < (r7+r8)/(r7-r8) < 2.5. \tag{6a}$$

The signs in the above conditional expressions have the same meanings as in the preceding paragraph.

When the imaging lenses composed of six optical elements according to the first and second embodiments satisfy conditional expressions (1b) to (6b) below, they bring about particularly advantageous effects:

$$0.116 \leq TN/f \leq 0.316 \tag{1b}$$

$$55.7 \leq vdN \leq 56.16 \tag{2b}$$

$$1.18 \leq fLG1/f \leq 1.632 \tag{3b}$$

$$0.523 \leq fLG2/f \leq 0.679 \tag{4b}$$

$$-0.633 \leq fLG3/f \leq -0.481 \tag{5b}$$

$$0.984 \leq (r7+r8)/(r7-r8) \leq 2.157. \tag{6b}$$

The signs in the above conditional expressions have the same meanings as in the paragraph before the preceding paragraph.

When the conditional expression (1) is satisfied, the space required for the aberration correction optical element NE becomes available and the freedom in the aspheric shape of the aberration correction optical element NE is increased while low-profileness is ensured, and aberrations in the peripheral area are corrected properly. Regarding TN in the conditional expression (1), if the aberration correction optical element NE is located between the fifth lens L5 of the third optical element group LG3 and the image plane IMG, TN or the distance on the optical axis between lenses where the aberration correction optical element NE is located, means the distance on the optical axis between the image-side surface of the fifth lens L5 and the image plane IMG.

When the conditional expression (2) is satisfied, the aberration correction optical element NE is made of low-dispersion material and aberrations in the peripheral area can be corrected properly.

When the conditional expression (3) is satisfied, the ratio of the focal length (fLG1) of the first optical element group LG1 to the focal length (f) of the overall optical system of the imaging lens is within an appropriate range to ensure low-profileness and correct aberrations properly.

When the conditional expression (4) is satisfied, the ratio of the focal length (fLG2) of the second optical element group LG2 to the focal length (f) of the overall optical system of the imaging lens is within an appropriate range to ensure low-profileness and correct spherical aberrations and coma aberrations properly.

When the conditional expression (5) is satisfied, the ratio of the focal length (fLG3) of the third optical element group LG3 to the focal length (f) of the overall optical system of the imaging lens is within an appropriate range to ensure low-profileness and correct spherical aberrations and chromatic aberrations properly.

When the conditional expression (6) is satisfied, the shape of the fourth lens L4 of the second optical element group LG2 is optimized to ensure low-profileness and easily suppress spherical aberrations which occur on the fourth lens L4.

When the conditional expression (7) is satisfied, the distribution of positive refractive power between the first optical element group LG1 and the second optical element group LG2 is optimized to ensure low-profileness.

When the conditional expression (8) is satisfied, spherical aberrations which occur on the fourth lens L4 of the second optical element group LG2 with strong positive refractive power are suppressed and it is easy for the third optical element group LG3 to correct aberrations.

In the imaging lenses according to the first and second embodiments, the Abbe number of the optical element with negative refractive power in the first optical element group LG1 is within the range from 20 to 30, and the Abbe numbers of the four other optical elements with refractive power are within the range from 40 to 70. The negative optical element in the first optical element group LG1 is made of high-dispersion material so as to correct axial aberrations and chromatic aberrations of magnification properly, and the four other optical elements with refractive power are made of low-dispersion material so as to suppress chromatic aberrations of magnification. Lenses whose Abbe numbers are within these ranges can be made of plastic material. Also, the aberration correction optical element NE may be made of plastic material which satisfies the conditional expression (2). Therefore, the imaging lens can be manufactured at low cost.

In these embodiments, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to the first and second embodiments will be explained. In each example, f denotes the focal length of the overall optical system of the imaging lens, Fno denotes an F-number, ω denotes a half field of view, ih denotes a maximum image height, TLA denotes total track length with a filter IR removed, and bf denotes a back focus with a filter IR removed. i denotes a surface number counted from the object side, r denotes a curvature radius, d denotes the distance on the optical axis between lens surfaces (surface distance), Nd denotes a refractive index at d-ray (reference wavelength), and νd denotes an Abbe number at d-ray. As for aspheric surfaces, an asterisk (*) after surface number i indicates that the surface concerned is an aspheric surface.

Numerical Example 1

The basic lens data of Example 1 is shown below.

Example 1

| in mm |
|---|
| f = 3.17 |
| Fno = 2.2 |
| ω(°) = 35.6 |
| ih = 2.30 |
| TLA = 3.68 |
| b f = 0.97 |

Surface Data

| Surface No. i | Curvature Radius r | Surface Distance d | Refractive Index Nd | Abbe Number ν d |
|---|---|---|---|---|
| (Object Surface) | Infinity | Infinity | | |
| 1 (Stop) | Infinity | −0.200 | | |
| 2* | 1.293 | 0.446 | 1.544 | 55.57 |
| 3* | 20.487 | 0.058 | | |
| 4* | 6.832 | 0.190 | 1.635 | 23.97 |
| 5* | 1.691 | 0.225 | | |
| 6* | 1.733 | 0.210 | 1.535 | 56.16 |
| 7* | 2.201 | 0.166 | | |
| 8* | Infinity | 0.261 | 1.535 | 56.16 |
| 9* | Infinity | 0.224 | | |
| 10* | −3.429 | 0.380 | 1.544 | 55.57 |
| 11* | −0.843 | 0.317 | | |
| 12* | −6.902 | 0.234 | 1.535 | 56.16 |
| 13* | 1.094 | 0.270 | | |
| 14 | Infinity | 0.210 | 1.517 | 64.20 |
| 15 | Infinity | 0.561 | | |
| Image Plane | Infinity | | | |

| Constituent Lens Data ||| Lens Group Data |||
|---|---|---|---|---|---|
| Lens | Start Surface | Focal Length | | Lens | Focal Length |
| 1 | 2 | 2.516 | 1st Optical Element Group (LG1) | Lens 1, 2, 3 | 4.165 |
| 2 | 4 | −3.591 | | | |
| 3 | 6 | 13.182 | 2nd Optical Element Group (LG2) | Lens 4 | 1.953 |
| 4 | 10 | 1.953 | | | |
| 5 | 12 | −1.749 | 3rd Optical Element Group (LG3) | Lens 5 | −1.749 |

Aspheric Surface Data

| | 2nd Surface | 3rd Surface | 4th Surface | 5th Surface | 6th Surface | 7th Surface |
|---|---|---|---|---|---|---|
| k | 8.561E−01 | 0.000E+00 | 0.000E+00 | −1.480E+01 | 0.000E+00 | 0.000E+00 |
| A4 | −4.781E−02 | −2.373E−01 | −5.308E−01 | −1.112E−01 | −5.203E−01 | −2.673E−01 |
| A6 | 9.036E−02 | 2.062E+00 | 3.721E+00 | 1.585E+00 | 3.145E−01 | −5.288E−02 |
| A8 | −8.704E−01 | −8.047E+00 | −1.223E+01 | −3.991E+00 | −8.580E−01 | −1.482E−01 |

-continued

|     | | | | | | |
| --- | --- | --- | --- | --- | --- | --- |
| A10 | 1.169E+00 | 1.786E+01 | 2.432E+01 | 6.174E+00 | 1.775E+00 | 3.365E−01 |
| A12 | 9.202E−01 | −2.561E+01 | −3.291E+01 | −6.985E+00 | −9.456E−01 | 0.000E+00 |
| A14 | −2.958E+00 | 1.558E+01 | 2.091E+01 | 4.524E+00 | 0.000E+00 | 0.000E+00 |
| A16 | 0.000E+00 | 0.000E+00 | 0.000E+00 | 0.000E+00 | 0.000E+00 | 0.000E+00 |

|     | 8th Surface | 9th Surface | 10th Surface | 11th Surface | 12th Surface | 13th Surface |
| --- | --- | --- | --- | --- | --- | --- |
| k   | 0.000E+00 | 0.000E+00 | 0.000E+00 | −4.021E+00 | 0.000E+00 | −8.842E+00 |
| A4  | −3.453E−02 | −6.055E−02 | 6.395E−02 | −1.608E−01 | −2.066E−01 | −1.953E−01 |
| A6  | −2.718E−03 | −7.635E−02 | −1.783E−02 | 3.151E−01 | 6.413E−02 | 1.101E−01 |
| A8  | 3.834E−03 | −1.785E−02 | −3.625E−02 | −1.893E−01 | 2.060E−02 | −5.073E−02 |
| A10 | 0.000E+00 | 7.015E−02 | −1.039E−01 | 9.446E−02 | −1.485E−02 | 1.448E−02 |
| A12 | 0.000E+00 | 0.000E+00 | 8.263E−02 | −5.784E−02 | 3.550E−03 | −2.579E−03 |
| A14 | 0.000E+00 | 0.000E+00 | 0.000E+00 | 1.662E−02 | −3.521E−04 | 2.241E−04 |
| A16 | 0.000E+00 | 0.000E+00 | 0.000E+00 | 0.000E+00 | 0.000E+00 | 0.000E+00 |

In this example, the aberration correction optical element NE as a double-sided aspheric element with virtually no refractive power is located between the first optical element group LG1 and the second optical element group LG2.

As shown in Table 1, the imaging lens in Example 1 satisfies all the conditional expressions (1) to (8).

Figure 2:
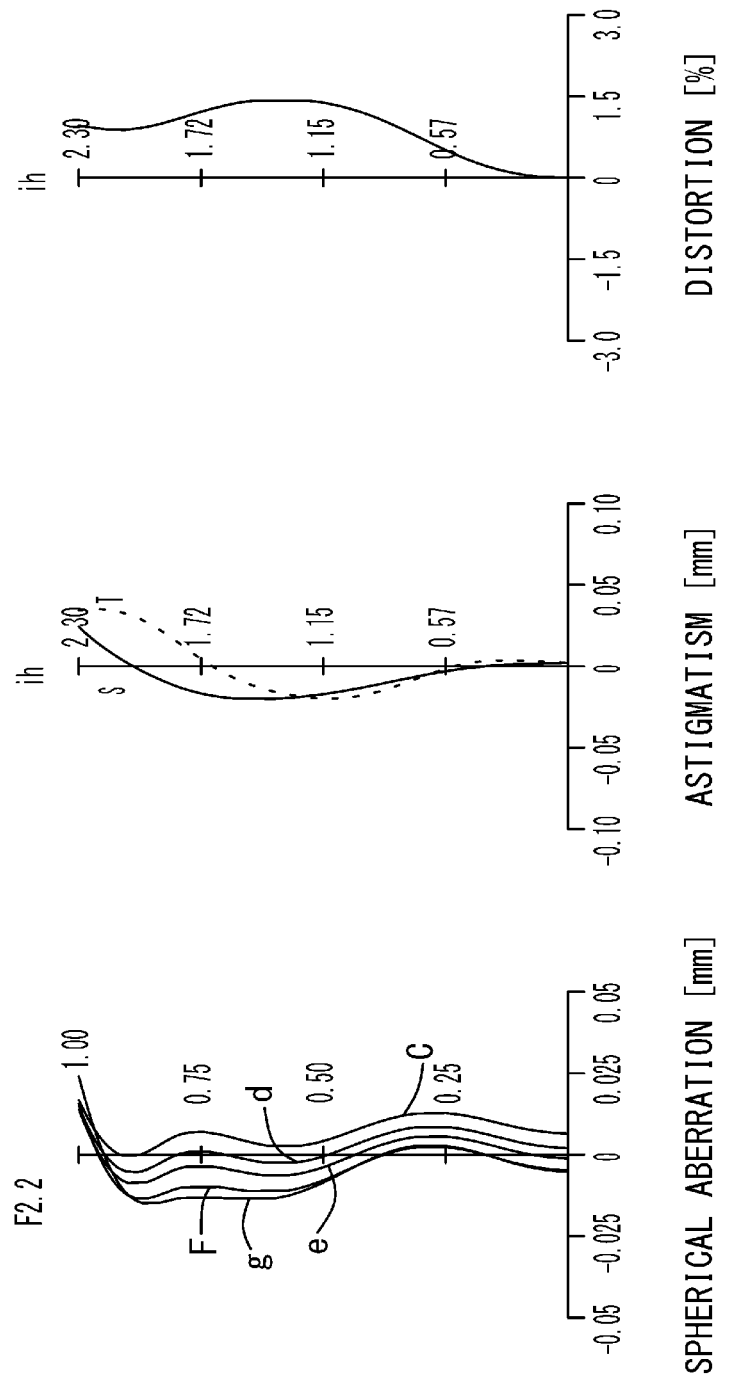
FIG. 2 shows spherical aberration, astigmatism, and distortion of the imaging lens in Numerical Example 1 according to the first embodiment of the present invention.

FIG. 2 shows spherical aberration (mm), astigmatism (mm), and distortion (%) of the imaging lens in Example 1. The spherical aberration diagram shows the amount of aberration at wavelengths of g-ray (436 nm), F-ray (486 nm), e-ray (546 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, and 12). As shown in FIG. 2, each aberration is corrected properly.

Numerical Example 2

The basic lens data of Example 2 is shown below.

Example 2 in mm
f = 2.72
Fno = 2.2
ω(°) = 39.9
ih = 2.30
TLA = 3.23
bf = 1.27

Surface Data

| Surface No. i | Curvature Radius r | Surface Distance d | Refractive Index Nd | Abbe Number ν d |
| --- | --- | --- | --- | --- |
| (Object Surface) | Infinity | Infinity | | |
| 1 (Stop) | Infinity | −0.144 | | |
| 2* | 1.211 | 0.384 | 1.544 | 55.57 |
| 3* | 10.995 | 0.065 | | |
| 4* | 9.551 | 0.190 | 1.635 | 23.97 |
| 5* | 1.828 | 0.153 | | |
| 6* | 1.865 | 0.265 | 1.535 | 56.16 |
| 7* | 4.067 | 0.385 | | |
| 8* | −1.910 | 0.352 | 1.544 | 55.57 |
| 9* | −0.700 | 0.015 | | |
| 10* | Infinity | 0.200 | 1.535 | 56.16 |
| 11* | Infinity | 0.099 | | |
| 12* | 29.760 | 0.234 | 1.535 | 56.16 |
| 13* | 0.809 | 0.250 | | |
| 14 | Infinity | 0.210 | 1.517 | 64.20 |
| 15 | Infinity | 0.500 | | |
| Image Plane | Infinity | | | |

| Constituent Lens Data | | | Lens Group Data | | | |
| --- | --- | --- | --- | --- | --- | --- |
| Lens | Start Surface | Focal Length | | | Lens | Focal Length |
| 1 | 2 | 2.468 | 1st Optical Element Group | (LG1) | Lens 1, 2, 3 | 3.205 |
| 2 | 4 | −3.594 | | | | |
| 3 | 6 | 6.182 | 2nd Optical Element Group | (LG2) | Lens 4 | 1.843 |
| 4 | 8 | 1.843 | | | | |
| 5 | 12 | −1.560 | 3rd Optical Element Group | (LG3) | Lens 5 | −1.560 |

-continued

Aspheric Surface Data

|  | 2nd Surface | 3rd Surface | 4th Surface | 5th Surface | 6th Surface | 7th Surface |
|---|---|---|---|---|---|---|
| k | 3.125E−01 | 0.000E+00 | 0.000E+00 | −2.203E+01 | 0.000E+00 | 0.000E+00 |
| A4 | −6.889E−02 | −3.482E−01 | −5.452E−01 | −6.307E−02 | −4.443E−01 | −1.370E−01 |
| A6 | 8.558E−02 | 1.907E+00 | 3.581E+00 | 1.661E+00 | 4.862E−01 | −1.155E−01 |
| A8 | −7.591E−01 | −8.068E+00 | −1.233E+01 | −4.071E+00 | −5.386E−01 | −2.717E−01 |
| A10 | 9.274E−01 | 1.794E+01 | 2.486E+01 | 6.064E+00 | 1.267E+00 | 6.931E−01 |
| A12 | −1.026E−01 | −2.571E+01 | −3.208E+01 | −7.226E+00 | −1.021E+00 | 0.000E+00 |
| A14 | −2.958E+00 | 1.694E+01 | 2.178E+01 | 5.551E+00 | 0.000E+00 | 0.000E+00 |
| A16 | 0.000E+00 | 0.000E+00 | 0.000E+00 | 0.000E+00 | 0.000E+00 | 0.000E+00 |

|  | 8th Surface | 9th Surface | 10th Surface | 11th Surface | 12th Surface | 13th Surface |
|---|---|---|---|---|---|---|
| k | 0.000E+00 | −3.648E+00 | 0.000E+00 | 0.000E+00 | 0.000E+00 | −7.338E+00 |
| A4 | 2.417E−01 | −1.116E−01 | −1.337E−01 | −2.895E−02 | −1.946E−01 | −2.089E−01 |
| A6 | −9.087E−02 | 3.334E−01 | −9.032E−03 | −1.506E−02 | 6.050E−02 | 1.172E−01 |
| A8 | −1.087E−01 | −1.978E−01 | 1.694E−02 | 2.224E−03 | 2.015E−02 | −5.833E−02 |
| A10 | −1.457E−01 | 8.103E−02 | 0.000E+00 | −1.947E−04 | −1.493E−02 | 1.557E−02 |
| A12 | 9.019E−02 | −5.739E−02 | 0.000E+00 | 0.000E+00 | 3.095E−03 | −2.053E−03 |
| A14 | 0.000E+00 | 1.533E−02 | 0.000E+00 | 0.000E+00 | −2.220E−04 | 1.364E−04 |
| A16 | 0.000E+00 | 0.000E+00 | 0.000E+00 | 0.000E+00 | 0.000E+00 | 0.000E+00 |

In this example, the aberration correction optical element NE as a double-sided aspheric element with virtually no refractive power is located between the second optical element group LG2 and the third optical element group LG3.

As shown in Table 1, the imaging lens in Example 2 satisfies all the conditional expressions (1) to (8).

Figure 4:
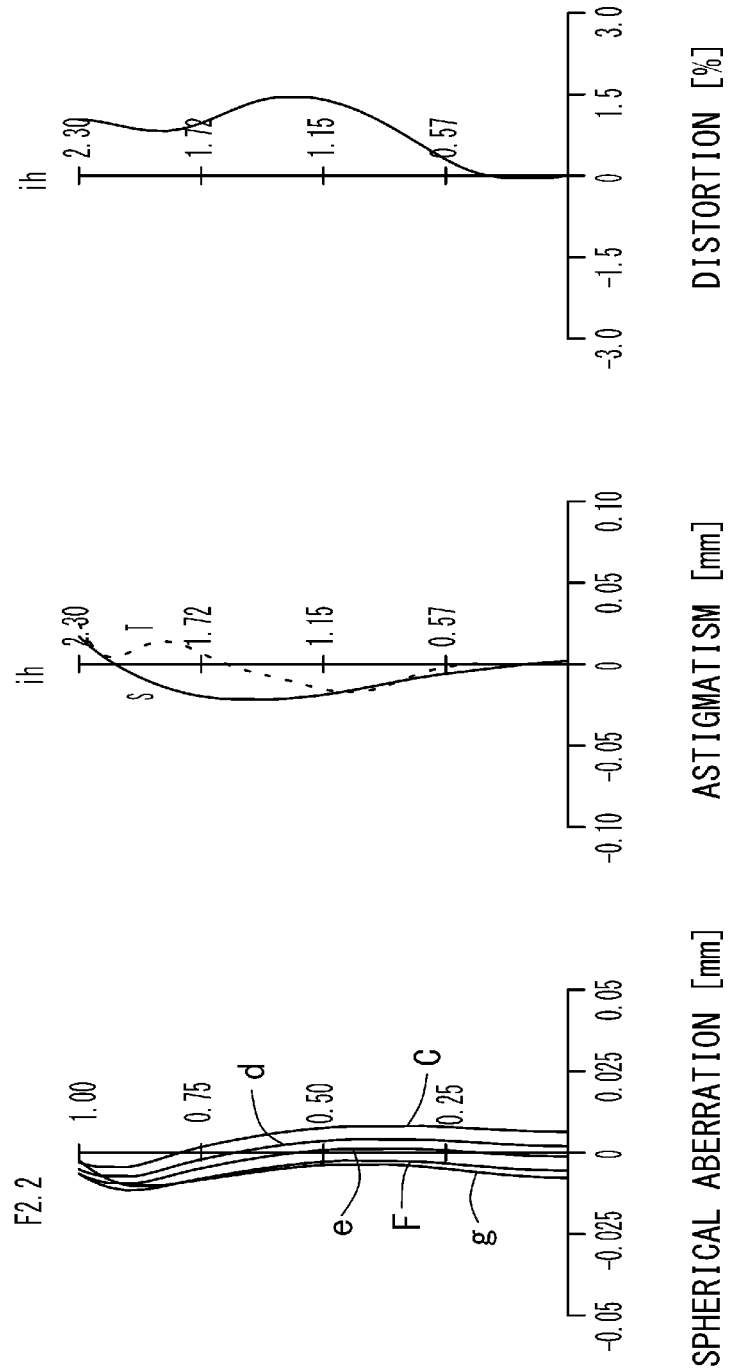
FIG. 4 shows spherical aberration, astigmatism, and distortion of the imaging lens in Numerical Example 2 according to the first embodiment of the present invention.

FIG. 4 shows spherical aberration (mm), astigmatism (mm), and distortion (%) of the imaging lens in Example 2. As shown in FIG. 4, each aberration is corrected properly.

Numerical Example 3

The basic lens data of Example 3 is shown below.

Example 3 in mm
f = 3.03
Fno = 2.2
ω(°) = 37.0
ih = 2.30
TLA = 3.66
bf = 1.27

Surface Data

| Surface No. i | Curvature Radius r | Surface Distance d | Refractive Index Nd | Abbe Number ν d |
|---|---|---|---|---|
| (Object Surface) | Infinity | Infinity | | |
| 1 (Stop) | Infinity | −0.155 | | |
| 2* | 1.380 | 0.411 | 1.544 | 55.57 |
| 3* | 26.639 | 0.069 | | |
| 4* | 8.467 | 0.190 | 1.635 | 23.97 |
| 5* | 1.828 | 0.168 | | |
| 6* | 1.690 | 0.242 | 1.535 | 56.16 |
| 7* | 2.681 | 0.475 | | |
| 8* | −1.826 | 0.403 | 1.544 | 55.57 |
| 9* | −0.666 | 0.065 | | |
| 10* | 4.555 | 0.369 | 1.535 | 56.16 |
| 11* | 0.725 | 0.184 | | |
| 12* | Infinity | 0.195 | 1.535 | 56.16 |
| 13* | Infinity | 0.150 | | |
| 14 | Infinity | 0.210 | 1.517 | 64.20 |
| 15 | Infinity | 0.600 | | |
| Image Plane | Infinity | | | |

-continued

| Constituent Lens Data | | | Lens Group Data | | | |
|---|---|---|---|---|---|---|
| Lens | Start Surface | Focal Length | | | Lens | Focal Length |
| 1 | 2 | 2.660 | 1st Optical Element Group | (LG1) | Lens 1, 2, 3 | 3.810 |
| 2 | 4 | −3.713 | | | | |
| 3 | 6 | 7.877 | 2nd Optical Element Group | (LG2) | Lens 4 | 1.718 |
| 4 | 8 | 1.718 | | | | |
| 5 | 12 | −1.669 | 3rd Optical Element Group | (LG3) | Lens 5 | −1.669 |

Aspheric Surface Data

| | 2nd Surface | 3rd Surface | 4th Surface | 5th Surface | 6th Surface | 7th Surface |
|---|---|---|---|---|---|---|
| k | 4.440E−01 | 0.000E+00 | 0.000E+00 | −2.178E+01 | 0.000E+00 | 0.000E+00 |
| A4 | −5.443E−02 | −3.053E−01 | −5.446E−01 | −1.257E−01 | −4.726E−01 | −1.805E−01 |
| A6 | 6.972E−02 | 1.952E+00 | 3.609E+00 | 1.565E+00 | 4.540E+00 | −2.462E−02 |
| A8 | −6.672E−01 | −8.107E+00 | −1.232E+01 | −4.105E+00 | −5.755E−01 | −2.497E−01 |
| A10 | 7.618E−01 | 1.821E+01 | 2.458E+01 | 5.931E+00 | 1.126E+00 | 5.553E−01 |
| A12 | 9.297E−01 | −2.561E+01 | −3.265E+01 | −6.942E+00 | −8.412E−01 | 0.000E+00 |
| A14 | −2.958E+00 | 1.557E+01 | 2.091E+01 | 4.411E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −3.940E+00 | 0.000E+00 | −6.903E+00 | 0.000E+00 | 0.000E+00 |
| A4 | 1.290E−01 | −2.073E−01 | −2.812E−01 | −2.091E−01 | −1.928E−03 | 1.790E−02 |
| A6 | 3.617E−02 | 3.303E−01 | 7.040E−02 | 1.050E−01 | 1.220E−03 | −3.763E−03 |
| A8 | −1.011E−01 | −1.691E−01 | 2.322E−02 | −5.249E−02 | 1.584E−04 | −1.215E−04 |
| A10 | −1.672E−01 | 9.536E−02 | −1.402E−02 | 1.567E−02 | −1.395E−04 | −4.048E−05 |
| A12 | 1.217E−01 | −6.336E−02 | 3.049E−03 | −2.204E−03 | 0.000E+00 | 0.000E+00 |
| A14 | 0.000E+00 | 1.149E−02 | −4.438E−04 | 8.336E−05 | 0.000E+00 | 0.000E+00 |
| A16 | 0.000E+00 | 0.000E+00 | 0.000E+00 | 0.000E+00 | 0.000E+00 | 0.000E+00 |

In this example, the aberration correction optical element NE as a double-sided aspheric element with virtually no refractive power is located between the third optical element group LG3 and the image plane IMG.

As shown in Table 1, the imaging lens in Example 3 satisfies all the conditional expressions (1) to (8).

Figure 6:
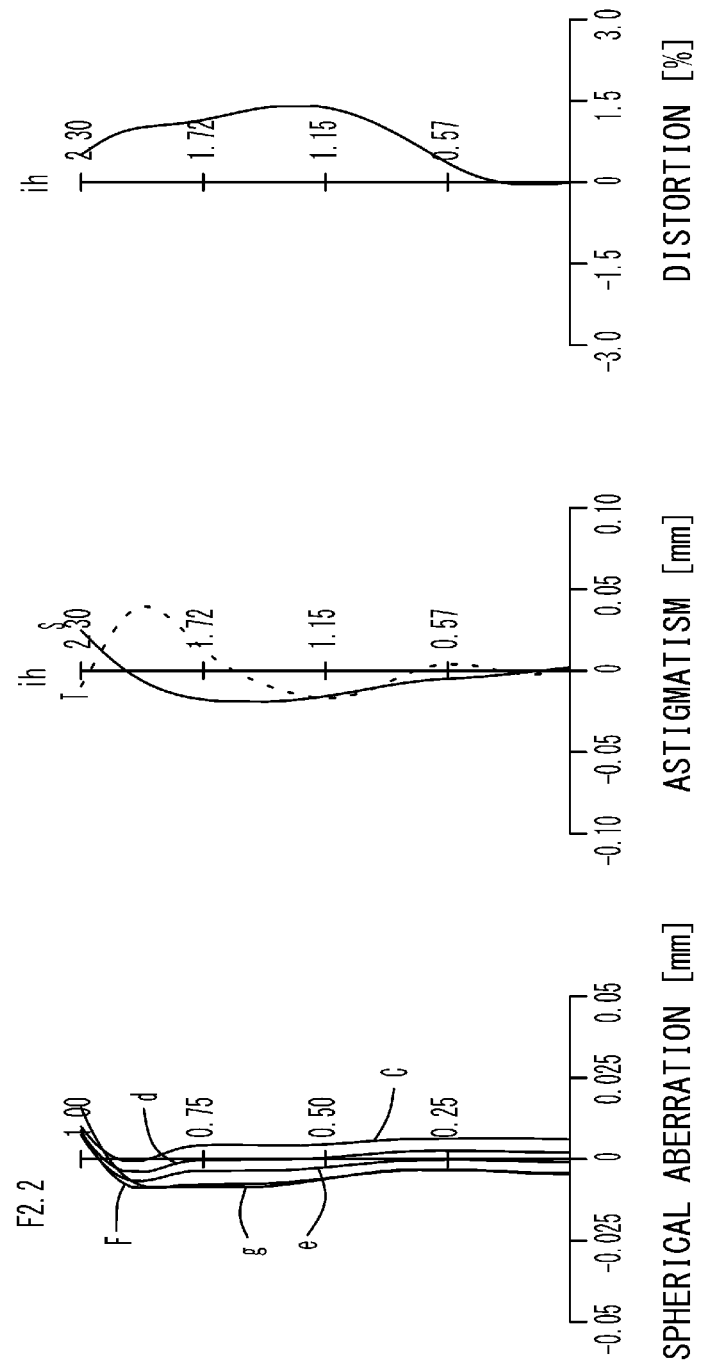
FIG. 6 shows spherical aberration, astigmatism, and distortion of the imaging lens in Numerical Example 3 according to the first embodiment of the present invention.

FIG. 6 shows spherical aberration (mm), astigmatism (mm), and distortion (%) of the imaging lens in Example 3. As shown in FIG. 6, each aberration is corrected properly.

Numerical Example 4

The basic lens data of Example 4 is shown below.

Example 4 in mm
f = 2.92
Fno = 2.4
ω(°) = 38.0
ih = 2.30
TLA = 3.73
bf = 0.98

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.091 | | |
| 2* | 1.638 | 0.349 | 1.544 | 55.57 |
| 3* | 3.535 | 0.092 | | |
| 4* | 2.546 | 0.345 | 1.544 | 55.57 |
| 5* | −19.086 | 0.061 | | |
| 6* | −3.423 | 0.246 | 1.614 | 25.58 |
| 7* | 8.564 | 0.219 | | |
| 8* | Infinity | 0.263 | 1.544 | 55.57 |

-continued

| | | | | |
|---|---|---|---|---|
| 9* | Infinity | 0.100 | | |
| 10* | −11.981 | 0.409 | 1.544 | 55.57 |
| 11* | −0.970 | 0.234 | | |
| 12* | 15.3667 | 0.427 | 1.535 | 56.16 |
| 13* | 0.9209 | 0.300 | | |
| 14 | Infinity | 0.210 | 1.517 | 64.20 |
| 15 | Infinity | 0.543 | | |
| Image Plane | Infinity | | | |

| Constituent Lens Data | | | Lens Group Data | | | |
|---|---|---|---|---|---|---|
| Lens | Start Surface | Focal Length | | | Lens | Focal Length |
| 1 | 2 | 5.274 | 1st Optical Element Group | (LG1) | Lens 1, 2, 3 | 4.773 |
| 2 | 4 | 4.154 | | | | |
| 3 | 6 | −3.950 | 2nd Optical Element Group | (LG2) | Lens 4 | 1.916 |
| 4 | 10 | 1.916 | | | | |
| 5 | 12 | −1.851 | 3rd Optical Element Group | (LG3) | Lens 5 | −1.851 |

Aspheric Surface Data

| | 2nd Surface | 3rd Surface | 4th Surface | 5th Surface | 6th Surface | 7th Surface |
|---|---|---|---|---|---|---|
| k | −1.307E+01 | 0.000E+00 | 0.000E+00 | 0.000E+00 | −4.078E+00 | 9.677E+01 |
| A4 | 3.185E−01 | −2.337E−01 | −1.468E−01 | −1.743E−01 | −3.297E−01 | −1.302E−01 |
| A6 | −8.798E−01 | −2.887E−01 | −4.634E−01 | 1.148E−02 | 9.842E−02 | −9.001E−02 |
| A8 | 1.714E+00 | −1.081E+00 | 1.231E+00 | 5.754E−01 | 1.953E+00 | 6.292E−01 |
| A10 | −2.691E+00 | 3.861E+00 | −9.378E+00 | −4.484E+00 | −4.711E+00 | −7.270E−01 |
| A12 | 9.089E−01 | −8.083E+00 | 1.967E+01 | 6.212E+00 | 3.458E+00 | 2.629E−01 |
| A14 | −1.764E−01 | 6.222E+00 | −1.542E+01 | −2.875E+00 | 0.000E+00 | 0.000E+00 |
| A16 | 0.000E+00 | 0.000E+00 | 0.000E+00 | 0.000E+00 | 0.000E+00 | 0.000E+00 |
| | 8th Surface | 9th Surface | 10th Surface | 11th Surface | 12th Surface | 13th Surface |
| k | 0.000E+00 | 0.000E+00 | −3.506E+02 | −5.607E+00 | 0.000E+00 | −4.981E+00 |
| A4 | −1.155E−01 | −2.681E−01 | −6.971E−02 | −1.505E−01 | −2.152E−01 | −1.917E−01 |
| A6 | 1.429E+00 | 5.027E−02 | −7.057E−03 | 5.047E−02 | −3.259E−02 | 1.162E−01 |
| A8 | −1.123E+00 | −3.726E−03 | 2.317E−02 | −7.642E−01 | 4.832E−02 | −5.590E−02 |
| A10 | 2.621E+00 | 7.303E−02 | −1.584E−02 | 6.239E−01 | 2.043E−03 | 1.654E−02 |
| A12 | −2.590E+00 | 0.000E+00 | 0.000E+00 | −2.254E−01 | 6.402E−03 | −2.586E−03 |
| A14 | 9.429E−01 | 0.000E+00 | 0.000E+00 | 2.247E−02 | −4.864E−03 | 1.500E−04 |
| A16 | 0.000E+00 | 0.000E+00 | 0.000E+00 | 0.000E+00 | 0.000E+00 | 0.000E+00 |

In this example, the aberration correction optical element NE as a double-sided aspheric element with virtually no refractive power is located between the first optical element group LG1 and the second optical element group LG2.

As shown in Table 1, the imaging lens in Example 4 satisfies all the conditional expressions (1) to (8).

Figure 8:
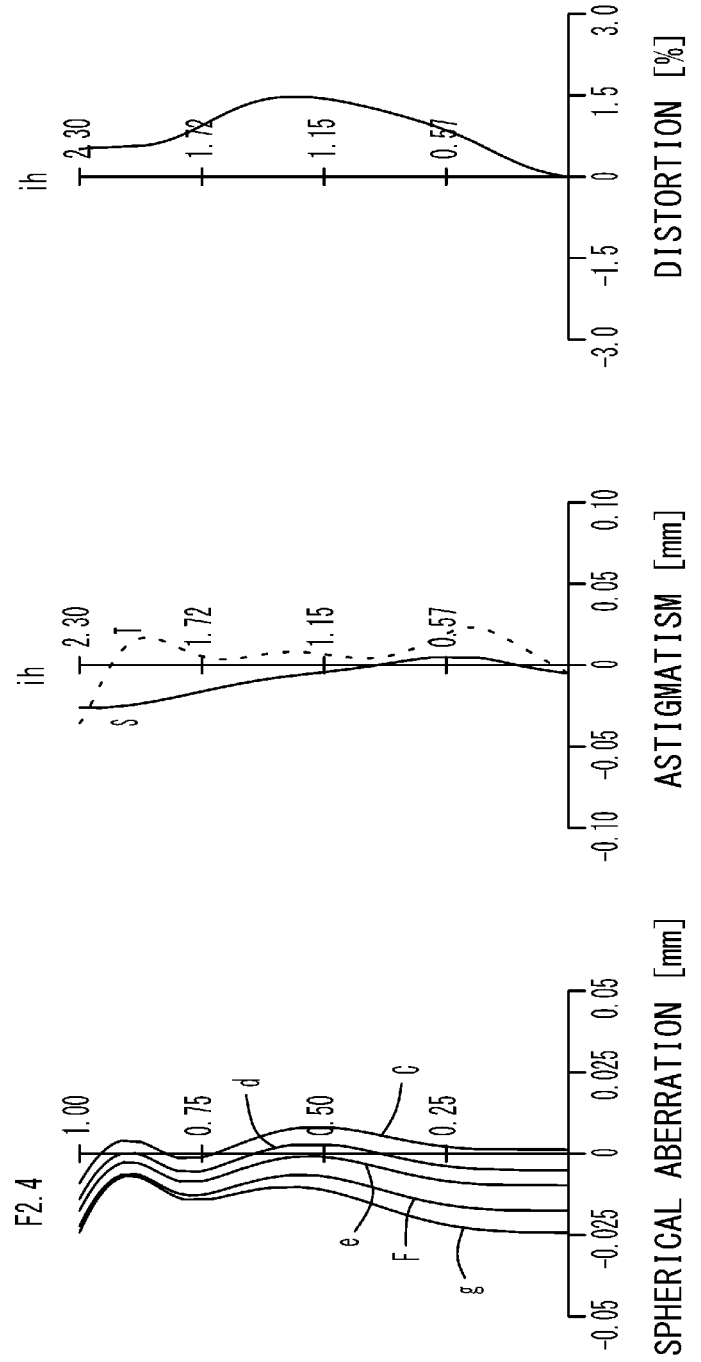
FIG. 8 shows spherical aberration, astigmatism, and distortion of the imaging lens in Numerical Example 4 according to the second embodiment of the present invention.

FIG. 8 shows spherical aberration (mm), astigmatism (mm), and distortion (%) of the imaging lens in Example 4. As shown in FIG. 8, each aberration is corrected properly.

Numerical Example 5

The basic lens data of Example 5 is shown below.

Example 5

| | |
|---|---|
| | in mm |
| f = | 2.79 |
| Fno = | 2.3 |
| ω(°) = | 39.4 |
| ih = | 2.30 |
| TLA = | 3.58 |
| bf = | 0.98 |

Surface Data

| Surface No. i | Curvature Radius r | Surface Distance d | Refractive Index Nd | Abbe Number ν d |
|---|---|---|---|---|
| (Object Surface) | Infinity | Infinity | | |
| 1 (Stop) | Infinity | −0.083 | | |

-continued

| | | | | |
|---|---|---|---|---|
| 2* | 1.631 | 0.344 | 1.544 | 55.57 |
| 3* | 2.516 | 0.057 | | |
| 4* | 1.851 | 0.355 | 1.544 | 55.57 |
| 5* | −18.415 | 0.060 | | |
| 6* | −3.560 | 0.190 | 1.614 | 25.58 |
| 7* | 8.520 | 0.236 | | |
| 8* | Infinity | 0.228 | 1.544 | 55.57 |
| 9* | Infinity | 0.170 | | |
| 10* | 100.000 | 0.472 | 1.544 | 55.57 |
| 11* | −0.798 | 0.066 | | |
| 12* | 97.4943 | 0.416 | 1.535 | 56.16 |
| 13* | 0.7102 | 0.300 | | |
| 14 | Infinity | 0.210 | 1.517 | 64.20 |
| 15 | Infinity | 0.546 | | |
| Image Plane | Infinity | | | |

| Constituent Lens Data | | | Lens Group Data | | | |
|---|---|---|---|---|---|---|
| Lens | Start Surface | Focal Length | | | Lens | Focal Length |
| 1 | 2 | 7.497 | 1st Optical Element Group | (LG1) | Lens 1, 2, 3 | 4.267 |
| 2 | 4 | −3.111 | | | | |
| 3 | 6 | −4.063 | 2nd Optical Element Group | (LG2) | Lens 4 | 1.459 |
| 4 | 10 | 1.459 | | | | |
| 5 | 12 | −1.340 | 3rd Optical Element Group | (LG3) | Lens 5 | −1.340 |

Aspheric Surface Data

| | 2nd Surface | 3rd Surface | 4th Surface | 5th Surface | 6th Surface | 7th Surface |
|---|---|---|---|---|---|---|
| k | −1.284E+01 | 0.000E+00 | 0.000E+00 | 0.000E+00 | −1.211E+00 | 1.000E+02 |
| A4 | 2.975E−01 | −3.670E−01 | −2.176E−01 | −1.654E−01 | −3.374E−01 | −1.004E−01 |
| A6 | −9.246E−01 | −5.333E−01 | −5.778E−01 | 6.986E−02 | 1.589E−01 | −4.343E−02 |
| A8 | 1.689E+00 | −8.243E−01 | 1.199E+00 | 5.091E−01 | 2.073E+00 | 5.764E−01 |
| A10 | −2.738E+00 | 4.297E+00 | −9.094E+00 | −4.473E+00 | −4.748E+00 | −7.692E−01 |
| A12 | 9.089E−01 | −8.083E+00 | 2.071E+01 | 6.355E+00 | 3.348E+00 | 3.433E−01 |
| A14 | −1.764E−01 | 6.222E+00 | −1.542E+01 | −2.929E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −5.990E+00 | 0.000E+00 | −5.659E+00 |
| A4 | −1.367E−01 | −3.587E−01 | −1.444E−01 | −1.503E−01 | −1.959E−01 | −1.730E−01 |
| A6 | 1.488E−01 | 1.214E−01 | −2.202E−02 | 4.896E−01 | −1.731E−02 | 1.001E−01 |
| A8 | −1.049E+00 | 4.480E−02 | 9.519E−02 | −7.689E−01 | 5.261E−02 | −4.696E−02 |
| A10 | 2.515E+00 | 1.020E−01 | −3.684E−02 | 6.194E−01 | −1.485E−03 | 1.435E−02 |
| A12 | −2.702E+00 | 0.000E+00 | 0.000E+00 | −2.221E−01 | 3.141E−04 | −2.552E−03 |
| A14 | 1.075E+00 | 0.000E+00 | 0.000E+00 | 2.482E−02 | −1.925E−03 | 1.897E−04 |
| A16 | 0.000E+00 | 0.000E+00 | 0.000E+00 | 0.000E+00 | 0.000E+00 | 0.000E+00 |

In this example, the aberration correction optical element NE as a double-sided aspheric element with virtually no refractive power is located between the first optical element group LG1 and the second optical element group LG2.

As shown in Table 1, the imaging lens in Example 5 satisfies all the conditional expressions (1) to (8).

Figure 10:
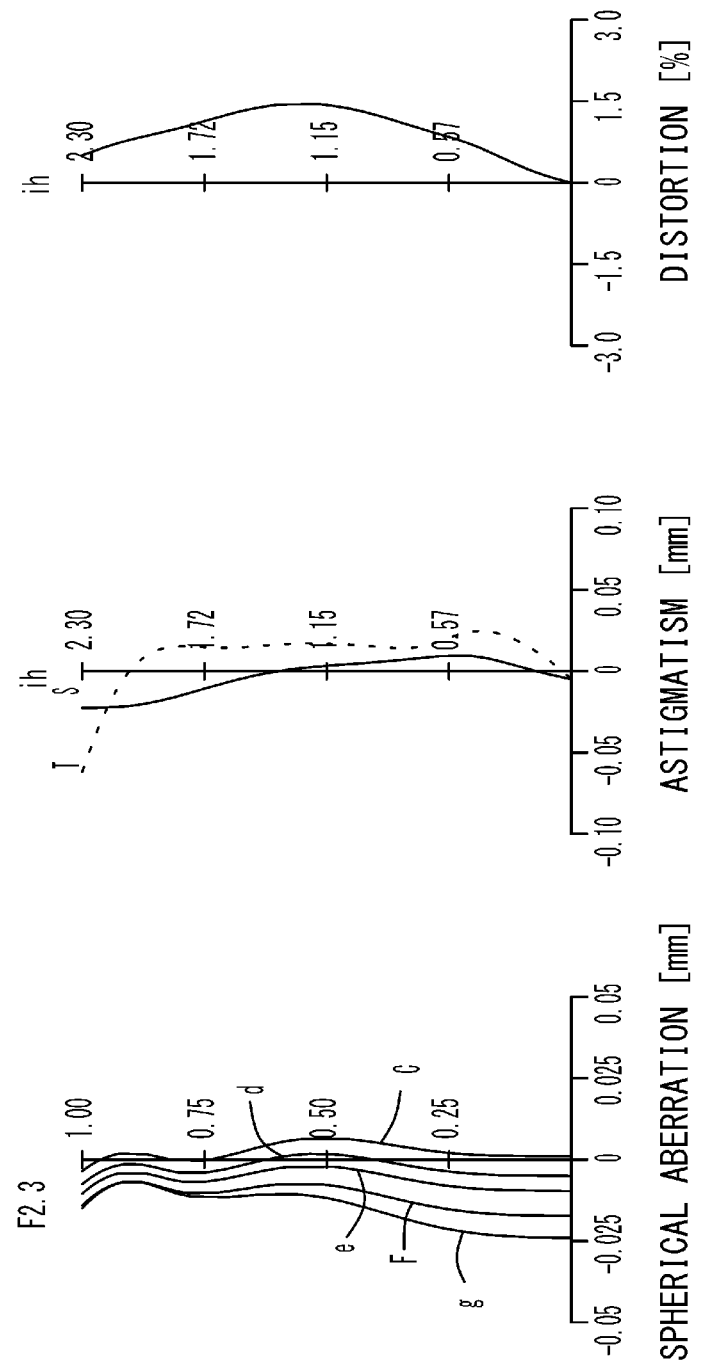
FIG. 10 shows spherical aberration, astigmatism, and distortion of the imaging lens in Numerical Example 5 according to the second embodiment of the present invention.

FIG. 10 shows spherical aberration (mm), astigmatism (mm), and distortion (%) of the imaging lens in Example 5. As shown in FIG. 10, each aberration is corrected properly.

Numerical Example 6

The basic lens data of Example 6 is shown below.

Example 6 in mm $f = 2.89$ $Fno = 2.4$ $\omega(°) = 38.4$

-continued

| | |
|---|---|
| ih = | 2.30 |
| TLA = | 3.66 |
| b f = | 0.99 |

Surface Data

| Surface No. i | Curvature Radius r | Surface Distance d | Refractive Index Nd | Abbe Number ν d |
|---|---|---|---|---|
| (Object Surface) | Infinity | Infinity | | |
| 1 (Stop) | Infinity | −0.082 | | |
| 2* | 1.650 | 0.327 | 1.544 | 55.57 |
| 3* | 2.070 | 0.056 | | |
| 4* | 1.541 | 0.362 | 1.544 | 55.57 |
| 5* | 100.000 | 0.060 | | |
| 6* | −4.236 | 0.238 | 1.614 | 25.58 |
| 7* | 8.533 | 0.256 | | |
| 8* | Infinity | 0.247 | 1.544 | 55.57 |
| 9* | Infinity | 0.160 | | |
| 10* | −21.346 | 0.438 | 1.544 | 55.57 |
| 11* | −0.844 | 0.109 | | |
| 12* | −135.9967 | 0.416 | 1.535 | 56.16 |
| 13* | 0.7786 | 0.300 | | |
| 14 | Infinity | 0.210 | 1.517 | 64.20 |
| 15 | Infinity | 0.550 | | |
| Image Plane | Infinity | | | |

| Constituent Lens Data | | | Lens Group Data | | | |
|---|---|---|---|---|---|---|
| Lens | Start Surface | Focal Length | | | Lens | Focal Length |
| 1 | 2 | 11.719 | 1st Optical Element Group | (LG1) | Lens 1, 2, 3 | 4.239 |
| 2 | 4 | 2.875 | | | | |
| 3 | 6 | −4.576 | 2nd Optical Element Group | (LG2) | Lens 4 | 1.603 |
| 4 | 10 | 1.603 | | | | |
| 5 | 12 | −1.447 | 3rd Optical Element Group | (LG3) | Lens 5 | −1.447 |

Aspheric Surface Data

| | 2nd Surface | 3rd Surface | 4th Surface | 5th Surface | 6th Surface | 7th Surface |
|---|---|---|---|---|---|---|
| k | −1.329E+01 | 0.000E+00 | 0.000E+00 | 0.000E+00 | 5.538E+00 | 1.000E+02 |
| A4 | 2.958E−01 | −4.099E−01 | −2.689E−01 | −2.069E−01 | −3.478E−01 | −9.472E−02 |
| A6 | −9.136E−01 | −5.440E−01 | −5.814E−01 | 4.326E−02 | 1.757E−01 | 1.466E−02 |
| A8 | 1.640E+00 | −7.154E−01 | 1.263E+00 | 4.900E−01 | 2.111E+00 | 5.382E−01 |
| A10 | −2.593E+00 | 4.192E+00 | −9.464E+00 | −4.335E+00 | −4.793E+00 | −8.175E−01 |
| A12 | 9.089E−01 | −8.083E+00 | 2.101E+01 | 6.476E+00 | 3.340E+00 | 4.048E−01 |
| A14 | −1.764E−01 | 6.222E+00 | −1.542E+01 | −3.175E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −5.837E+00 | 0.000E+00 | −5.776E+00 |
| A4 | −1.473E−01 | −3.547E−01 | −1.391E−01 | −1.552E−01 | −1.811E−01 | −1.711E−01 |
| A6 | 1.786E−01 | 1.221E−01 | −4.513E−02 | 4.855E−01 | −1.755E−02 | 1.014E−01 |
| A8 | −1.017E+00 | 2.372E−02 | 1.039E−01 | −7.654E−01 | 4.982E−02 | −4.802E−02 |
| A10 | 2.452E+00 | 8.709E−02 | −2.864E−02 | 6.182E−01 | −3.238E−03 | 1.455E−02 |
| A12 | −2.755E+00 | 0.000E+00 | 0.000E+00 | −2.207E−01 | −6.735E−04 | −2.532E−03 |
| A14 | 1.200E+00 | 0.000E+00 | 0.000E+00 | 2.447E−02 | −1.023E−03 | 1.828E−04 |
| A16 | 0.000E+00 | 0.000E+00 | 0.000E+00 | 0.000E+00 | 0.000E+00 | 0.000E+00 |

In this example, the aberration correction optical element NE as a double-sided aspheric element with virtually no refractive power is located between the first optical element group LG1 and the second optical element group LG2.

As shown in Table 1, the imaging lens in Example 6 satisfies all the conditional expressions (1) to (8).

Figure 12:
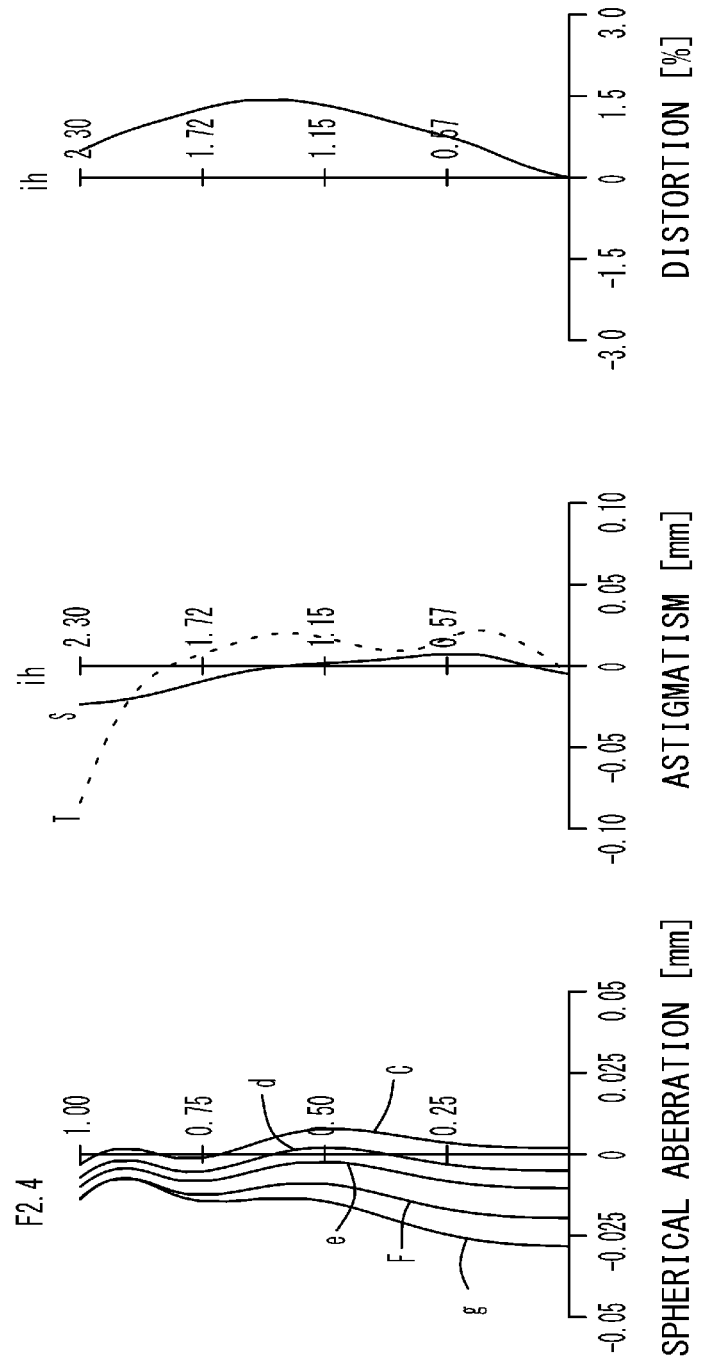
FIG. 12 shows spherical aberration, astigmatism, and distortion of the imaging lens in Numerical Example 6 according to the second embodiment of the present invention.

FIG. 12 shows spherical aberration (mm), astigmatism (mm), and distortion (%) of the imaging lens in Example 6. As shown in FIG. 12, each aberration is corrected properly.

TABLE 1

|  | Example 1 | Example 2 | Example 3 | Example 4 | Example 5 | Example 6 |
|---|---|---|---|---|---|---|
| (1) TN/f | 0.205 | 0.116 | 0.316 | 0.199 | 0.227 | 0.229 |
| (2) vdN | 56.16 | 56.16 | 56.16 | 55.57 | 55.57 | 55.57 |
| (3) fLG1/f | 1.313 | 1.180 | 1.256 | 1.632 | 1.530 | 1.467 |
| (4) fLG2/f | 0.616 | 0.679 | 0.566 | 0.655 | 0.523 | 0.555 |
| (5) fLG3/f | −0.551 | −0.574 | −0.550 | −0.633 | −0.481 | −0.501 |
| (6) (r7 + r8)/(r7 − r8) | 1.652 | 2.157 | 2.148 | 1.176 | 0.984 | 1.082 |
| (7) fLG1 > fLG2 | 4.165 > 1.953 | 3.205 > 1.843 | 3.81 > 1.718 | 4.773 > 1.916 | 4.267 > 1.459 | 4.239 > 1.603 |
| (8) fLG2 > \|fLG3\| | 1.953 > 1.749 | 1.843 > 1.56 | 1.718 > 1.669 | 1.916 > 1.851 | 1.459 > 1.34 | 1.603 > 1.447 |

As explained above, the imaging lenses composed of six optical elements in the examples according to the first and second embodiments of the present invention are compact enough to meet the growing demand for low-profileness, with total track length of 4.0 mm or less, though they use five elements for an imaging lens and one element with virtually no refractive power for aberration correction, that is, six optical elements in total. When the degree of low-profileness is expressed by the ratio of total track length TLA to maximum image height (TLA/2ih), the TLA/2ih ratio of each of these imaging lenses is in the range from 0.7 to 0.8. In addition, the imaging lenses offer a wider field of view (70 to 80 degrees) than existing imaging lenses and brightness with an F-value of 2.5 or less, and correct various aberrations properly and can be manufactured at low cost.

When any one of the imaging lenses composed of six optical elements in the examples according to the first and second embodiments of the present invention is used in an image pickup device mounted in an increasingly compact and low-profile mobile terminal such as a smartphone, mobile phone or PDA (Personal Digital Assistant), or a game console or an information terminal such as a PC, or a home appliance with a camera function, it contributes to the low-profileness of the image pickup device and provides high camera performance.

The effects of the present invention are as follows.

According to the aspects of the present invention, there is provided a compact low-cost imaging lens which meets the demand for low-profileness, offers brightness with an F-value of 2.5 or less and a wide field of view, and corrects various aberrations properly.

What is claimed is:

1. An imaging lens composed of six optical elements which forms an image of an object on a solid-state image sensor, in which the elements are arranged in order from an object side to an image side, the imaging lens comprising:
    a first optical element group with positive refractive power including:
        a first lens with positive refractive power having a convex surface on the object side as a first optical element;
        a second lens with negative refractive power having a concave surface on the image side as a second optical element; and
        a third lens with positive refractive power having a convex surface on the object side as a third optical element;
    a second optical element group with positive refractive power including a fourth lens with positive refractive power having a convex surface on the image side as a fourth optical element; and
    a third optical element group with negative refractive power including a double-sided aspheric fifth lens with negative refractive power having a concave surface on the image side as a fifth optical element, wherein
    at least one pole-change point is formed off an optical axis on the image-side surface of the fifth lens; and
    a double-sided aspheric aberration correction optical element which has a flat surface near the optical axis with virtually no refractive power as a sixth optical element is located in an air gap nearer to an image plane than the first optical element group.

2. An imaging lens composed of six optical elements which forms an image of an object on a solid-state image sensor, in which the elements are arranged in order from an object side to an image side, the imaging lens comprising:
    a first optical element group with positive refractive power including:
        a first lens with positive refractive power having a convex surface on the object side as a first optical element;
        a second lens with positive refractive power having a convex surface on the object side as a second optical element; and
        a third lens with negative refractive power having a concave surface on the image side as a third optical element;
    a second optical element group with positive refractive power including a fourth lens with positive refractive power having a convex surface on the image side as a fourth optical element; and
    a third optical element group with negative refractive power including a double-sided aspheric fifth lens with negative refractive power having a concave surface on the image side as a fifth optical element, wherein
    at least one pole-change point is formed off an optical axis on the image-side surface of the fifth lens; and
    a double-sided aspheric aberration correction optical element which has a flat surface near the optical axis with virtually no refractive power as a sixth optical element is located in an air gap nearer to an image plane than the first optical element group.

3. The imaging lens composed of six optical elements according to claim 1, wherein the aberration correction optical element is located between the first optical element group and the second optical element group.

4. The imaging lens composed of six optical elements according to claim 1, wherein the aberration correction optical element is located between the second optical element group and the third optical element group.

5. The imaging lens composed of six optical elements according to claim 1, wherein the aberration correction optical element is located on the image side of the third optical element group.

6. The imaging lens composed of six optical elements according to claim 1, wherein conditional expressions (1) and (2) below are satisfied:

$$0.1 < TN/f < 0.5 \quad (1)$$

$$40 < vdN < 60 \quad (2)$$

where
TN: distance on the optical axis of an air gap where the aberration correction optical element is located
f: focal length of an overall optical system of the imaging lens
vdN: Abbe number of the aberration correction optical element at d-ray.

7. The imaging lens composed of six optical elements according to claim 1, wherein aspheric surfaces on both sides of the aberration correction optical element are shaped so as to curve toward the object side with increasing distance from the optical axis.

8. The imaging lens composed of six optical elements according to claim 1, wherein a conditional expression (3) below is satisfied:

$$1.0 < fLG1/f < 2.0 \quad (3)$$

where
fLG1: focal length of the first optical element group
f: focal length of an overall optical system of the imaging lens.

9. The imaging lens composed of six optical elements according to claim 1, wherein a conditional expression (4) below is satisfied:

$$0.3 < fLG2/f < 1.0 \quad (4)$$

where
fLG2: focal length of the second optical element group
f: focal length of an overall optical system of the imaging lens.

10. The imaging lens composed of six optical elements according to claim 1, wherein a conditional expression (5) below is satisfied:

$$-0.8 < fLG3/f < -0.2 \quad (5)$$

where
fLG3: focal length of the third optical element group
f: focal length of an overall optical system of the imaging lens.

11. The imaging lens composed of six optical elements according to claim 1, wherein a conditional expression (6) below is satisfied:

$$0.8 < (r7+r8)/(r7-r8) < 4.5 \quad (6)$$

where
r7: curvature radius of the object-side surface of the fourth lens constituting the second optical element group
r8: curvature radius of the image-side surface of the fourth lens constituting the second optical element group.

12. The imaging lens composed of six optical elements according to claim 2, wherein the aberration correction optical element is located between the first optical element group and the second optical element group.

13. The imaging lens composed of six optical elements according to claim 2, wherein the aberration correction optical element is located between the second optical element group and the third optical element group.

14. The imaging lens composed of six optical elements according to claim 2, wherein the aberration correction optical element is located on the image side of the third optical element group.

15. The imaging lens composed of six optical elements according to claim 2, wherein conditional expressions (1) and (2) below are satisfied:

$$0.1 < TN/f < 0.5 \quad (1)$$

$$40 < vdN < 60 \quad (2)$$

where
TN: distance on the optical axis of an air gap where the aberration correction optical element is located
f: focal length of an overall optical system of the imaging lens
vdN: Abbe number of the aberration correction optical element at d-ray.

16. The imaging lens composed of six optical elements according to claim 2, wherein aspheric surfaces on both sides of the aberration correction optical element are shaped so as to curve toward the object side with increasing distance from the optical axis.

17. The imaging lens composed of six optical elements according to claim 2, wherein a conditional expression (3) below is satisfied:

$$1.0 < fLG1/f < 2.0 \quad (3)$$

where
fLG1: focal length of the first optical element group
f: focal length of an overall optical system of the imaging lens.

18. The imaging lens composed of six optical elements according to claim 2, wherein a conditional expression (4) below is satisfied:

$$0.3 < fLG2/f < 1.0 \quad (4)$$

where
fLG2: focal length of the second optical element group
f: focal length of an overall optical system of the imaging lens.

19. The imaging lens composed of six optical elements according to claim 2, wherein a conditional expression (5) below is satisfied:

$$-0.8 < fLG3/f < -0.2 \quad (5)$$

where
fLG3: focal length of the third optical element group
f: focal length of an overall optical system of the imaging lens.

20. The imaging lens composed of six optical elements according to claim 2, wherein a conditional expression (6) below is satisfied:

$$0.8 < (r7+r8)/(r7-r8) < 4.5 \quad (6)$$

where
r7: curvature radius of the object-side surface of the fourth lens constituting the second optical element group
r8: curvature radius of the image-side surface of the fourth lens constituting the second optical element group.

21. An imaging lens composed of six optical elements which forms an image of an object on a solid-state image sensor, in which the elements are arranged in order from an object side to an image side, the imaging lens comprising:
a first optical element group with positive refractive power including:

a first lens with positive refractive power having a convex surface on the object side as a first optical element;

a second lens with negative refractive power having a concave surface on the image side as a second optical element; and a third lens that is a meniscus lens having positive or negative refractive power as a third optical element;

a second optical element group with positive refractive power including a fourth lens with positive refractive power having a convex surface on the image side as a fourth optical element; and a third optical element group with negative refractive power including a double-sided aspheric fifth lens with negative refractive power having a concave surface on the image side as a fifth optical element, wherein at least one pole-change point is formed off an optical axis on the image-side surface of the fifth lens; and a double-sided aspheric aberration correction optical element which has a flat surface near the optical axis with virtually no refractive power as a sixth optical element is located in an air gap nearer to an image plane than the first optical element group.

* * * * *